(12) United States Patent  
Davidow et al.

(10) Patent No.: US 8,229,780 B2  
(45) Date of Patent: Jul. 24, 2012

(54) SYSTEM AND METHOD FOR ONLINE LEAD GENERATION

(75) Inventors: Dorothy Young Davidow, Old Brookville, NY (US); Barry Sirote, Modiin (IL); Annie X. Tan, Poughkeepsie, NY (US); Jian Zhou, Jinan (CN); T. Theodore Xidas, Kings Park, NY (US)

(73) Assignee: SilverCarrot, Inc., New York, NY (US)

( * ) Notice: Subject to any disclaimer, the term of this patent is extended or adjusted under 35 U.S.C. 154(b) by 1213 days.

(21) Appl. No.: 12/021,718

(22) Filed: Jan. 29, 2008

(65) Prior Publication Data

US 2009/0037253 A1    Feb. 5, 2009

Related U.S. Application Data

(60) Provisional application No. 60/935,184, filed on Jul. 30, 2007.

(51) Int. Cl.
*G06F 17/00* (2006.01)
(52) U.S. Cl. .................................. 705/7.29; 705/14.4
(58) Field of Classification Search .............. 705/7.29, 705/14.4
See application file for complete search history.

(56) References Cited

U.S. PATENT DOCUMENTS

| | | |
|---|---|---|
| 6,452,609 B1 | 9/2002 | Katinsky et al. |
| 6,766,356 B1 | 7/2004 | Krautter |
| 6,769,019 B2 | 7/2004 | Ferguson |
| 6,941,562 B2 | 9/2005 | Gao et al. |
| 6,944,828 B2 | 9/2005 | Gao et al. |
| 2003/0229893 A1 | 12/2003 | Sgaraglino |
| 2005/0076051 A1* | 4/2005 | Carobus et al. ............... 707/102 |
| 2005/0108095 A1 | 5/2005 | Perlmutter |
| 2005/0138077 A1* | 6/2005 | Michael et al. ............ 707/104.1 |
| 2005/0188007 A1 | 8/2005 | Warner et al. |
| 2005/0235030 A1* | 10/2005 | Lauckhart et al. ............ 709/200 |
| 2006/0212350 A1 | 9/2006 | Ellis et al. |
| 2006/0277108 A1 | 12/2006 | Altberg et al. |
| 2006/0288111 A1 | 12/2006 | Katinsky et al. |
| 2007/0038516 A1* | 2/2007 | Apple et al. .................... 705/14 |
| 2007/0043620 A1 | 2/2007 | Leason et al. |
| 2007/0124207 A1 | 5/2007 | Faber et al. |
| 2007/0294133 A1 | 12/2007 | Lasker et al. |
| 2008/0208761 A1 | 8/2008 | Autry et al. |

* cited by examiner

OTHER PUBLICATIONS

International Search Report for international Application No. PCT/US08/71478, Oct. 27, 2008.

*Primary Examiner* — Thomas Dixon
(74) *Attorney, Agent, or Firm* — Pearl Cohen Zedek Latzer, LLP

(57) ABSTRACT

A system and method for collecting and processing user data over a network relating to a given advertisement. The invention displays advertisements on a given web page to a user running a web browser application on a client. In response to a user action such as clicking on the advertisement or moving the mouse cursor over the advertisement, a form is displayed to the user for input of data. The user may then input data into the form, and receive a new advertisement in the same location as the old advertisement upon completing the form. At no point is the user redirected to a new web page, nor does a new web page "pop up" over or under the current web page. The user inputted data is checked for accuracy and completeness, and may either be sent to the advertiser immediately or stored for future transmission. This data collection, processing, and delivery is all handled by the real-time communication within the original web page context. Advertisements selected for display are targeted to the user based on a variety of factors.

24 Claims, 6 Drawing Sheets

SYSTEM AND METHOD FOR ONLINE LEAD GENERATION

CROSS REFERENCE TO RELATED APPLICATIONS

This application claims priority under 35 U.S.C. §119(e) of U.S. Provisional Application Ser. No. 60/935,184, filed Jul. 30, 2007, which is hereby incorporated by reference in its entirety.

BACKGROUND OF THE INVENTION

The present invention relates to the field of lead generation and online advertising, and to a system and method for providing a complete online advertisement system for the World Wide Web and lead generation therefrom. Particularly, the present invention relates to the field of data transmission and to communication between a visitor to a web page and a backend system configured for use by, for example, service representatives and/or sales persons, facilitating lead generation and sales efforts. More particularly, this invention relates to banner advertisement display as well as the real-time data collection, validation, and delivery of leads generated via interactive banners all processed within the original web page on which the banner is displayed.

The Internet has become an advertisement media to reach globally populated users of the World Wide Web. A variety of web pages on the Internet now carry spaces set apart for the display of certain content not necessarily native to the site, and often provided (and sometimes hosted) by a third-party, such as, for example, a space housing an advertisement or content promoting a particular service on a site. Such spaces are often referred to as display spaces, and frequently contain an image or animation embedded in an area on the web page. Currently, the predominant form of advertising on the Internet is the banner advertisement.

Banner advertisements can be made up of virtually any item that can be displayed on a web page. A banner ad may include text or graphics, possibly animated, and is generally displayed on a fixed portion of a web page. Some examples include a static picture in the form of a .GIF or .JPG image, a movie, or as an interactive area where a user can play a game. Most web pages have specific areas dedicated to advertising banners although some web pages utilize floating or moving banners that can show up in virtually any area of the web page—even directly over the web page content itself.

Typically, the advertisements included in the web pages contain only a limited amount of information (e.g., a small paragraph, an icon, etc.). The advertisements in the context described herein refer to any call to action that requires data capture, and generally contain links to web sites that provide further detailed information. In certain arrangements, the advertisers pay the advertisements based on the number of visits directed to their web sites by the links of the advertisements. In certain embodiments, such advertisements can be provided by advertisers or by the web page itself.

The interaction of online advertising typically involves three parties:

User—this is the person viewing the web page that contains the display space or banner ad. The user is viewing the web page for the content of the web page itself and may or may not be interested in the banner advertisements that are displayed alongside the content. The user data collected is considered the "Lead" that the advertiser wants to collect.

Website—this is the host of the web page content and the banner advertisement. The web site produces content that the user is interested in viewing. Additionally, the website hosts banner advertisements primarily as a means of revenue paid to them by the advertiser or as a way of obtaining information for its own usage.

Advertiser—the advertiser is the person or company that has a product it wants to sell or an item it wants to publicize or a newsletter for which it wants the user to sign up. The advertiser may also simply be interested in obtaining user-supplied information for marketing or product development reasons. The advertiser may be a third party or may be the web page host itself. There are numerous other scenarios for advertisers but the ones listed are some of the typical scenarios. The banner advertisement is what the advertiser uses to attract the user's attention to the advertiser's product, item or newsletter.

One form of online lead generation is via the display of advertisements in the form of a banner ad. Traditionally, the user would click on the banner to either sign up for the item being advertised or to obtain additional information about the product or item displayed in the banner. Conventionally, upon clicking on the banner, either the user would be redirected to a new URL (the user would go from www.xyz.com to www-.banner_site.com) and would no longer remain on the original web page they were viewing, or the banner would launch a pop-up a web page in a separate window and the user would need to view that new window. Thus, when an end user clicks on a display space or a banner ad on a web page, the end user terminal is connected to a server hosting the destination web content of the content provider for the space, and the server then enables an end user to view the content linked to the space at the user's terminal.

Currently, the effectiveness of most Internet advertisements is measured by their "click rate", this is, the ratio of the number of times the advertisements are clicked on by Internet users to the number of times the advertisements are viewed. As is well known in the art, Internet advertisements generally include banners having a link to another web page or site such that, by clicking on an Internet advertisement, a user's browser is directed to the other web page or site that then displays information or material that is particularly relevant to the advertisement.

Often, however, the goal of the advertisement is to obtain contact information (or leads) for web site visitors who indicate that they are interested in the product being advertised. Lead generation is the process of collecting and delivering to an advertiser the user information that the user has entered, acknowledging the user's interest in a product or service of the advertiser or of the web host itself. Knowing such information enables the advertiser or the web host to replicate that success and begin to maximize their return on investment. In addition, it is important for the sales person receiving the lead to know exactly who is the web site visitor (or prospect) who responded to the advertisement. This allows the client to focus its marketing efforts on those most likely to purchase, leading to more cost-effective sales techniques.

In lead generation advertisements, the redirection of the user to a new web site or new window would then allow the user to follow-up on the advertisement for additional information or to sign up for the product/item. Thus, the data collection for generating this lead would occur on the advertiser's site when the user views more details and then enters his detailed information. The advertisers can the follow-up with this lead.

FIGS. 1A and 1B illustrate the conventional, prior art user-website-advertiser interaction. The user visits a web page of interest and notices an advertisement in the form of a banner.

FIG. 1A shows a web page with an advertisement displayed as a banner. The user clicks on the banner to sign up or view more information about the item being advertised. Once the user clicks on the banner, a new browser window is opened and the user is redirected to a new web page hosted by the advertiser or by the web host. FIG. 1B shows what occurs when a user clicks on the traditional ad banner, namely that the original context is lost and the user is taken to a new browser window and a new web site. FIG. 1B shows the new web page in a new window to which the user is redirected after the user clicks on the banner ad. As shown in FIG. 1B, the entire content of the original web page is covered, and the context of the original web page has now shifted entirely to the advertiser's site.

This type of approach has several negative ramifications for all the parties involved in online advertising interaction. The user is negatively affected with this traditional approach because his main focus and point of reference have been changed. Instead of continuing on that original web page of interest, the user now needs to look at a new web page that contains the advertisement information. In order to return to that original web page of interest, the user must close the new window or hit the browsers "Back" button and then re-orient his location of focus on his original web page. This affects the user's concentration and causes the user to take extras and time to return to his original web page and focus.

The website is negatively affected since the user has now left the original web site's page and is on a different window or web page—now, the user either may not return to the original web page or may return to the original web page but may lose interest in it, since he needs to re-orient himself back to the original web page. This causes the web site to have users spend less time on (or not return at all to) their web pages viewing more content or additional revenue generating banners (or other revenue sources for the site).

Additionally, since the user loses time and orientation, this type of interaction may stop users from clicking additional banners of interest, causing the web site to lose out on potential revenue and the advertiser to lose out on getting users to notice the items being advertised.

Further, the advertiser who is represented by the banner is negatively affected since the user who has gone from the original web page to the new window or web page may want to return to the original web page as quickly as possible, by closing the new window or hitting the browser's "Back" button as soon as possible to return to the original site. This means that the user is not giving the advertiser's web page his full concentration and time. Additionally, since many users already understand traditional banner interaction, they are hesitant to click the banner at all since they don't want to move to another web page or a new window, as their main point of interest is on the original web page.

Another limitation of traditional banner advertising occurs when the user has installed certain "pop-up blockers" or has his web browser security settings set to "High". A high security setting in a web browser or "pop-up blocker" may prevent a new browser window from launching. This will prevent the advertiser's website from displaying when the user clicks on the banner. In this scenario, the user will not be given the chance to view the advertiser's website and the advertiser will not have the chance to collect a lead.

This may cause many users to quickly want to return back to their original web page of interest. In order for the user to return to their original web page, the user needs to close this new window and re-orient himself to the original context. The user has spent extra time and effort, the web site has possibly lost a user from returning, and the advertiser does not receive the full attention of the user.

More recently, a new type of banner advertisement has been developed that allows for the collection of data directly inside the banner through the use of an embedded form and/or buttons. This circumvents some of the negative aspects of traditional banners by allowing the user to remain on the current web page instead of being redirected elsewhere. However, this new type of banner does not account for seamless integration with the web site hosting this type of banner. For these banners, the web site needs to develop customized server-side programs to capture the data, process it, and then deliver the data to the advertiser or to the web host. This is a time-consuming and costly process.

SUMMARY OF THE INVENTION

The present invention is directed to a system and method of lead-generation using interactive advertisement banners displayed on a web page to combine the display of the banner, render the associated data-collection form fields, validate the user entered data, store the data, and deliver the collected data to the advertiser. A preferred method and apparatus takes place between a client computer (user) and a server in an interconnected network of computers such as the Internet or intranet.

This all takes place within the context of the original web page displaying the banner advertisement. The invention, utilizing its targeting engine, will display the most appropriate advertisement in the form of the banner. This banner may be an image, FLASH Object, or any other item that a modern web browser can render. When the user clicks on the banner to sign up for the item or to receive more detailed information, the system will generate the additional HTML and form fields and embed them directly into the current web page. The user will not be redirected nor receive a new window or web page.

The system combines display of interactive advertisement banners, data collection, storage, verification, and data delivery all occurring within the original page context. This includes facilities for displaying targeted advertisements, collecting, storing, verifying, and delivering the inputted data (in real-time or scheduled). All of those processes occur within the original web page that the user is viewing and does not link to, pop-up, redirect to, nor open any other web pages. This is facilitated via the use of real-time client-to-server and server-to-client communication. The banner dynamically expands within the original web page context allowing additional information and enhanced lead-generation capabilities to render. The associated data collection form fields are shown when the user rolls-over or clicks on the advertisement banner.

The user can then fill out the dynamically generated data-collection form fields to sign up for the advertised item or to receive more information from the advertiser or from the web host, e.g., via a newsletter. The system will preferably verify the user's entered data in real-time while the user remains on that same page within the same context. Verification of user entered data consists of localized advertiser-specific rules, such as making sure that the user entered certain types of information or fits certain type of criteria. Verification also includes checking user entered data for more generic items, such as a valid phone number and postal address.

Once the data has been verified, it will be stored and then delivered to the advertiser. This delivery can be done in real-time where the data will be sent to the advertiser as soon as it is collected and verified. Alternatively, this verified data may be delivered upon an advertiser specified schedule. Once the advertiser receives the data collected, the advertiser can then process it in the appropriate manner.

The system then has the option of sending over a new banner advertisement and the entire process can repeat itself an unlimited number of times. The system may display the additional advertisements within the original space of the initial banner advertisement, or alternatively in a new location, after the previous advertisement has been acted upon. The system employs a targeting engine based on previous responses by the user and external behavioral and demographic factors to select the next banner advertisement to be displayed. Each time the user will still remain on the original web page within the original context.

In addition, the system can automatically swap out the original banner advertisement and display a different one in its place if the user has not selected the original advertisement within a system-configurable allotted amount of time.

In one embodiment, the hosting web site, i.e., the web site being visited by the user, does not need to host the banner images. The hosting web site needs only to insert a brief section of HTML code as to where the banner advertisement is to be displayed. That section of HTML code will reference a JavaScript file that will initiate the system. The invention will then manage the entire life-cycle of the banner advertisement: selecting the correct banner to display; rendering the associated HTML code and images; managing the user interaction, data verification, and data collection; delivering the user data to the advertiser; determining and displaying replacement banner advertisements. As opposed to the banners that allow for data capture inside the banner, this system does not require the web site hosting the banner to make any customized server-side programs to capture, process, and pass off the data to the advertiser. The web site, using the system, simply needs to add one line of supplied JavaScript code to the web page. The remote servers as disclosed in this application will then handle the data capture, processing, and data aggregation completely. The user does not need to leave the original web page to view the detailed content of the advertisement or sign up for the item being advertised.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be best understood by reference to the following detailed description when read with the accompanied drawings in which:

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention provides a method and system for a complete Online Lead-Generation System combining display of interactive advertisement banners, data collection, data storage, data verification, data delivery and redisplay of replacement advertisement banners, all occurring within the original page context.

Figure 1A:
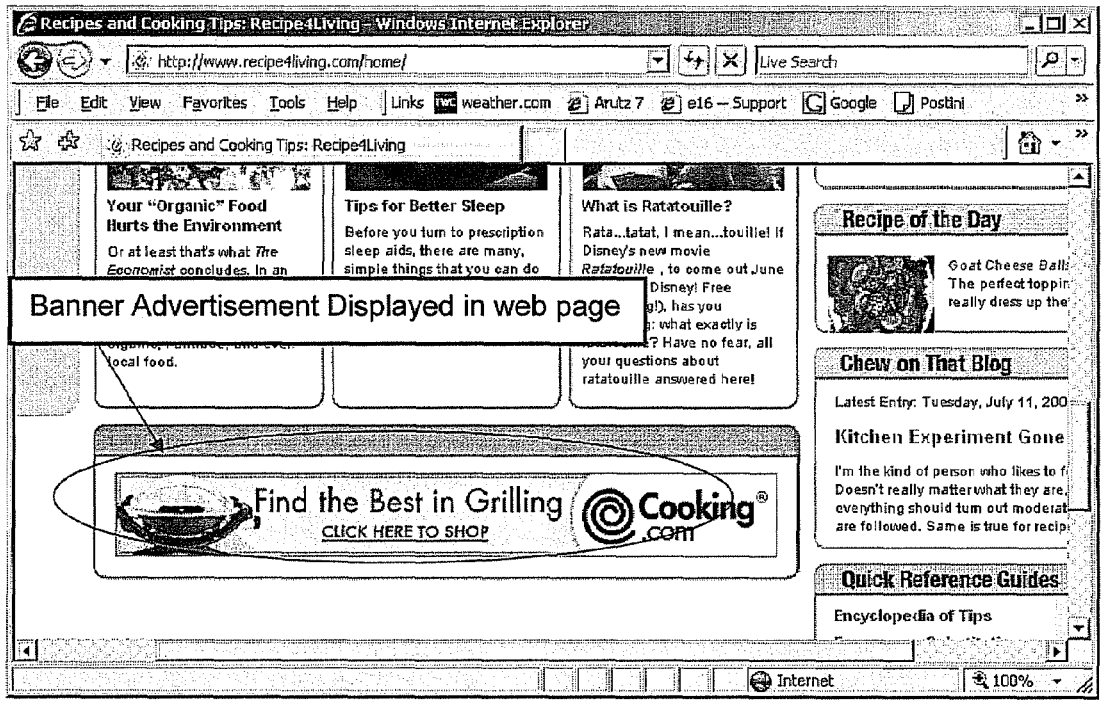
FIG. 1A shows a traditional advertising banner on a web page, in accordance with the prior art.
Figure 1B:
FIG. 1B shows what occurs when a user clicks on the traditional banner in accordance with prior art, namely that the original context is lost and the user is taken to a new browser window and a new web site.
Figure 2A:
FIG. 2A shows an advertising banner on a web page, in accordance with the invention.
Figure 2B:
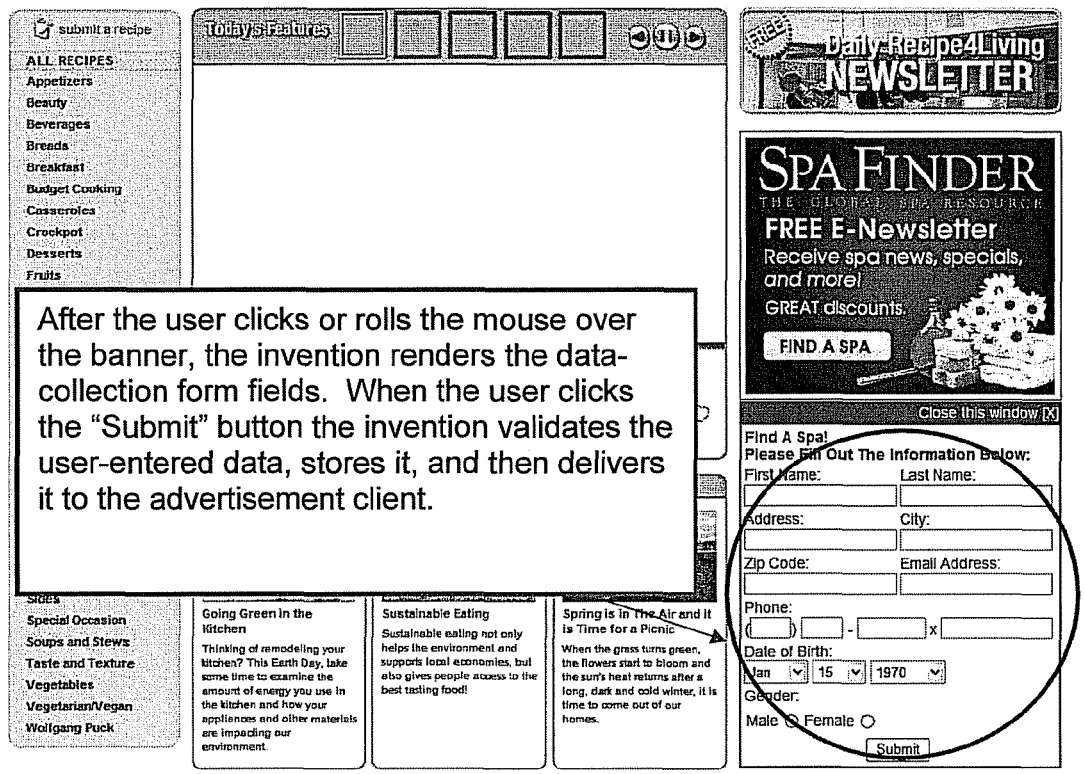
FIG. 2B shows what occurs when a user clicks on the banner powered by the invention.

FIGS. 2A and 2B illustrate this interactive exchange and the resultant additional HTML that has been rendered. FIG. 2A is a depiction of an advertising banner generated by the invention. On the surface, this web page appears identical to the way a web page with a banner advertisement appears in accordance with the prior art, as shown in FIG. 1A. Namely, the banner ad is displayed in a display space of a web page for the user to view and act upon.

FIG. 2B illustrates what occurs when a user clicks on the banner powered by one embodiment of the invention. When user clicks or rolls his mouse over the banner ad, the banner ad dynamically expands, displaying additional information about the advertised item and embedding data-collection form fields into the web page's original context.

If the user does not wish to obtain further information about the product or service being advertised in the banner, the user simply clicks elsewhere on the web page, and the form fields disappear. If the user would like to obtain further information about the product or service being advertised in the banner, the user may complete the data collection form fields that are displayed on the web page, e.g., to sign up for the advertised item or to receive more information from the advertiser. When the user clicks "Submit", the user data is then taken and validated, stored and delivered to the advertisement client.

The system will verify the user's entered data in real-time while the user remains on that same page within the same context. Verification of user entered data consists of using localized advertiser-specific rules, such as making sure the user entered certain types of information or fits certain type of criteria. Verification also includes checking user entered data for more generic items, such as a valid phone number and postal address.

After the initial banner advertisement is either passed over or is completed and submitted, the system also then displays additional advertisements within the original space of the initial banner advertisement, as shown in FIG. 2A. The system employs a targeting engine based on previous responses and behavioral and demographic factors to select the next banner advertisement. In addition, the system can swap out the original banner advertisement and display a different one in its place, if the user has not selected the original advertisement within a system-configurable amount of time.

All of those processes occur within the original web page that the user is viewing and does not link to, pop-up, redirect to, nor open any other web pages. Additionally, the system handles all of the processing via real-time client-to-server and server-to-client communication. The web site hosting this banner does not need to make any additional customizations or server-side changes.

Figure 3:
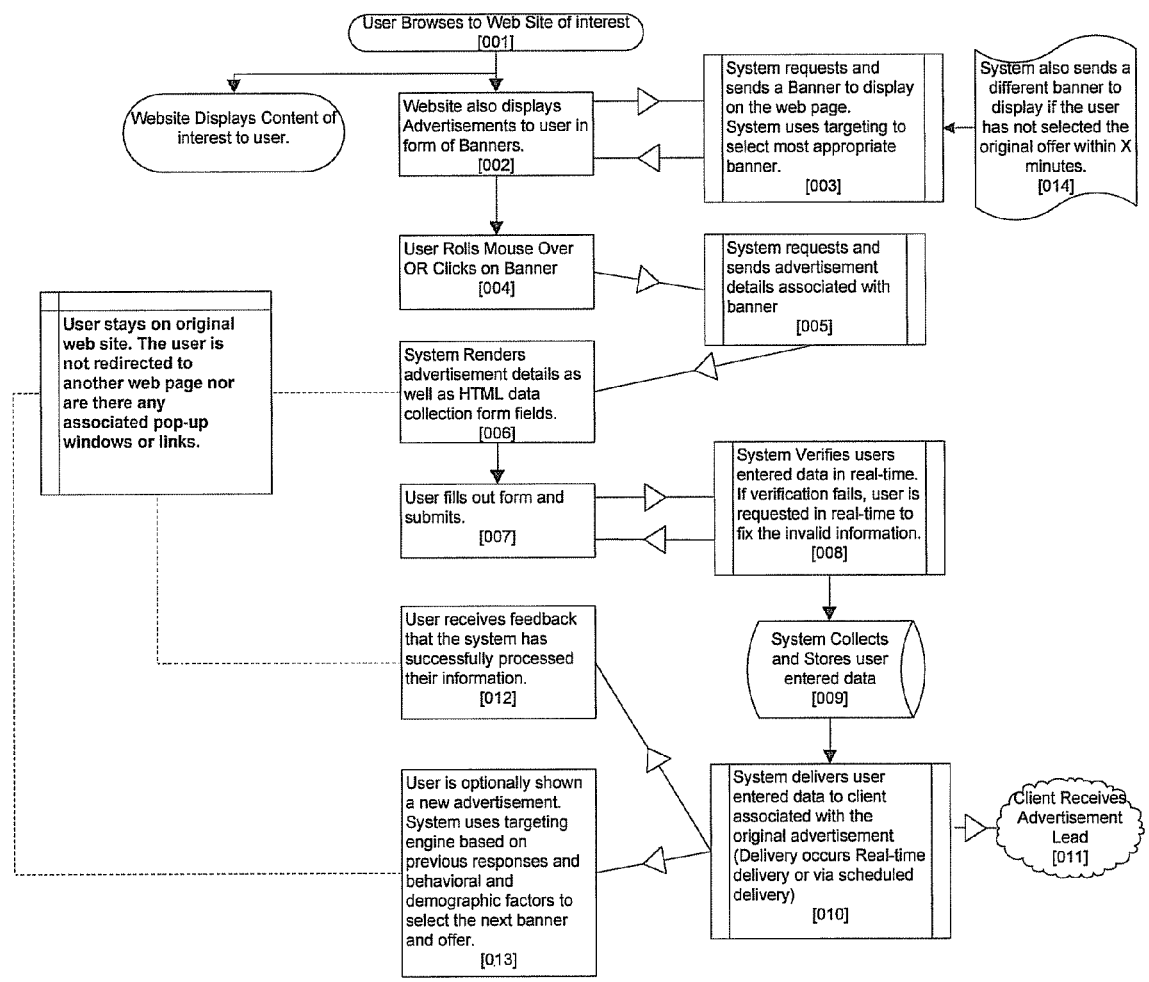
FIG. 3 shows a flow chart modeling the overall method and system of the invention.

FIG. 3 shows a process flow of the overall method and system of the invention in accordance with one embodiment of the invention, including the web page and banner advertisement context, the user action, real-time server-side communication and processing, and final delivery of lead (user entered data) to the advertiser. As shown in FIG. 3, the middle column refers to actions taken by the web host or user on the web page, and the right column refers to actions taken by the system on the server "behind the scenes" and invisible to the user.

A user first browses a web page of interest that has been coded in accordance with the invention [box 001]. This site can be a news oriented site, sports related site, health related site or whatever site the user is interested in viewing online. Alongside the web site's page content, the web site displays advertisements in the form of banner ads [box 002], which are a source of revenue for most web sites, as web site hosts may charge advertisers for displaying the advertiser's banner on their web site. A less common method of generating revenue based upon these advertisements, but one of somewhat greater importance for the purposes of this invention, is to charge the advertiser for any registration or sales leads that are generated for the advertiser by the display of the banner on the web site. In certain embodiments, such advertisements can be provided by advertisers or by the web page itself.

The invention is embedded into the web site simply by adding small sections of HTML code that reference a JavaScript file hosted on a server platform separate from the host web site. The host web site does not need to perform any other coding or processing. All other functionality [boxes 003-013] is handled through this JavaScript file reference.

The system requests and sends a banner to display on the web page [box 003]. The system then uses targeting to select the most appropriate banner. For example, the web page host may have an idea of the demographics of the users who typically visit its web site, and such information may be transmitted to the system for use in choosing which banner advertisements to display. In addition, the user himself may have previously provided some information or demographic data that may by used by the system in choosing which banner advertisements to display.

The user then rolls the mouse over, or clicks on, the banner [box 004]. The system requests advertisement details associated with the banner and sends them to be displayed on the web page [box 005]. The system then renders advertisement details, as well as HTML data collection form fields, on the web page [box 006]. Even once this occurs, the user stays on the original web page and is not redirected to another web page, nor are there any associated pop-up windows or links.

The user may then choose to fill out the data collection form by entering some personal information and submit it, e.g., by clicking an "OK" button displayed [box 007]. The system will then verify the user entered data, or a portion thereof, in real-time [box 008]. If verification fails, the user is requested in real time to fix the invalid information. If verification is successful, the system will then collect and store the user-entered data [box 009].

The system delivers the user's entered data to the client associated with the original advertisement [box 010]. Such delivery may occur real-time, namely delivery of each user information as it is verified, or via scheduled delivery, such as by batch delivery. The client, which may be the web host itself, then receives the advertising lead for its use [box 011]. The user may also receive feedback that the system has successfully processed his/her information. The invention handles this data delivery using real-time client-to-server and server-to-client communication. The web site hosting the banner does not need to develop any customized programs to handle this data delivery. It is completely encapsulated within the banner system.

In one embodiment, the system may also send a different, replacement banner ad to the user if the user has not selected the offer on the original banner ad within a predefined period or if the user has already selected the offer on the original banner ad [box 013]. The system uses a targeting engine based on previous responses and behavioral and demographic factors to select the next banner and offer. This replacement advertisement is chosen in a manner similar to how the initial advertisement is chosen, except this time, if the user has already selected the offer on the original banner ad, the system has more user information to utilize in targeting to select the most appropriate banner.

Figure 4:
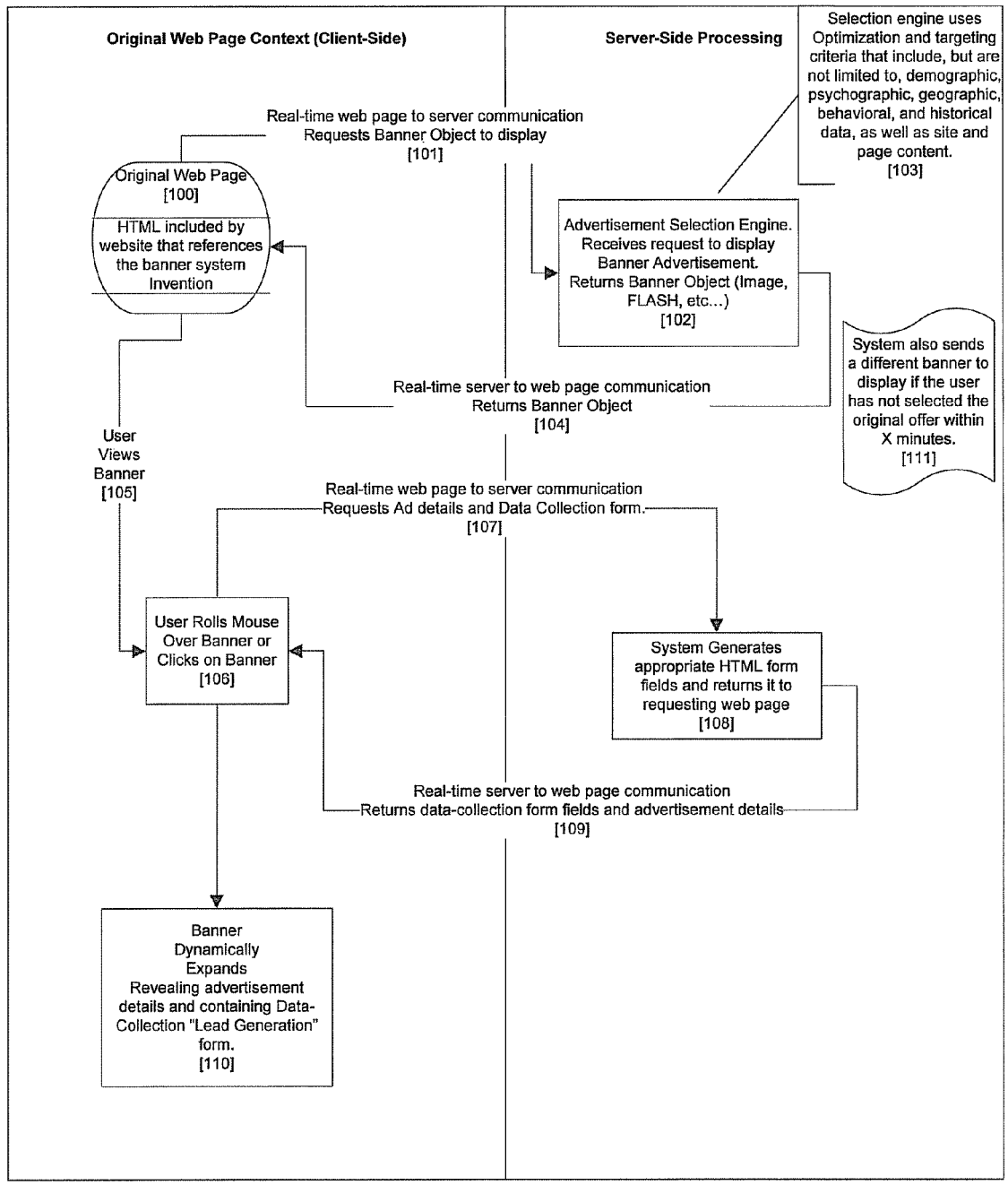
FIG. 4 describes the targeting engine and real-time web page to server communication that chooses and renders the advertisement banner and associated data-collection form.

FIG. 4 illustrates the mechanics involved in the system's display and rendering of the banner advertisement by the banner advertisement selection engine, as well as the area near the banner that dynamically expands when the user clicks or rolls over the banner. The invention facilitates communication between the web browser in the original page context (client-side) and the server processing of the banner display (server-side) to decide which banner to display.

As shown in FIG. 4, the original web page includes some HTML code that references the banner system determined by the server [box 100]. The web page, on the client-side, communicates with the server-side and requests a banner advertisement object to display in the web page context that the user is browsing [box 101]. The advertisement selection (targeting) engine, the operation of which is described herein, receives the request to display the banner advertisement [box 102], and the selection engine uses optimization and targeting criteria that include, but are not limited to, demographic, psychographic, geographic, behavioral and historical data, as well as web site page content, to selects an advertisement to display on the web page [box 103]. The advertisement selection (targeting) engine then returns the Banner Object (usually in the form of an Image or Flash file) back to the client side web page to be rendered directly in the web page [box 104].

This communication between client and server all takes place directly within the web page context and in real-time (immediate synchronous client-to-server and server-to-client communication) as soon as the web page loads. This communication between client and server also takes place "behind the scenes", without any interference with the user's browsing or web experience. The user does not need to refresh or reload his original web page, nor does the user need to view another web page or browser window. The user is then able to view the web page content and the advertisement banners on the same web page [box 105]. Since the invention utilizes real-time client-to-server and server-to-client communication, the hosting web site does not need to make any changes or develop any customized programs.

In one embodiment of the invention, if the user has not selected the original banner advertisement within a specified time period, the server may send a different banner display to the web page for display thereon in the same banner space as the original advertisement [box 111]. This specified time frame is configurable within the system.

If the user rolls his mouse over the banner or clicks on the banner, signaling an intent to obtain more information regarding the product or service being advertised [box 106]. The real time web page requests the further advertisement details and the data collection form from the server via real-time client-to-server communication [box 107]. The server generates the associated HTML code for the banner advertisement and the appropriate HTML form fields for the data-collection form [box 108] and then returns it in real-time to the web page via server-to-client communication [box 109]. If desired, the advertiser may provide guidance as to required fields in order for the appropriate information to be gathered. The banner advertisement on the web page then dynamically expands to include this new HTML code, revealing more details about the advertisement, and renders it in the web browser on that original page [box 110]. This dynamically created area also renders an associated data-collection form that the user can fill out and submit if interested in the product or service being advertised.

This type of dynamically expanded area is illustrated in FIG. 3b. The user is not redirected to a new link nor does a new window pop-up, open or launch. All this interaction occurs within the original web page context. The lead has now been generated on the client-side and needs to be processed and delivered to the advertiser.

Figure 5:
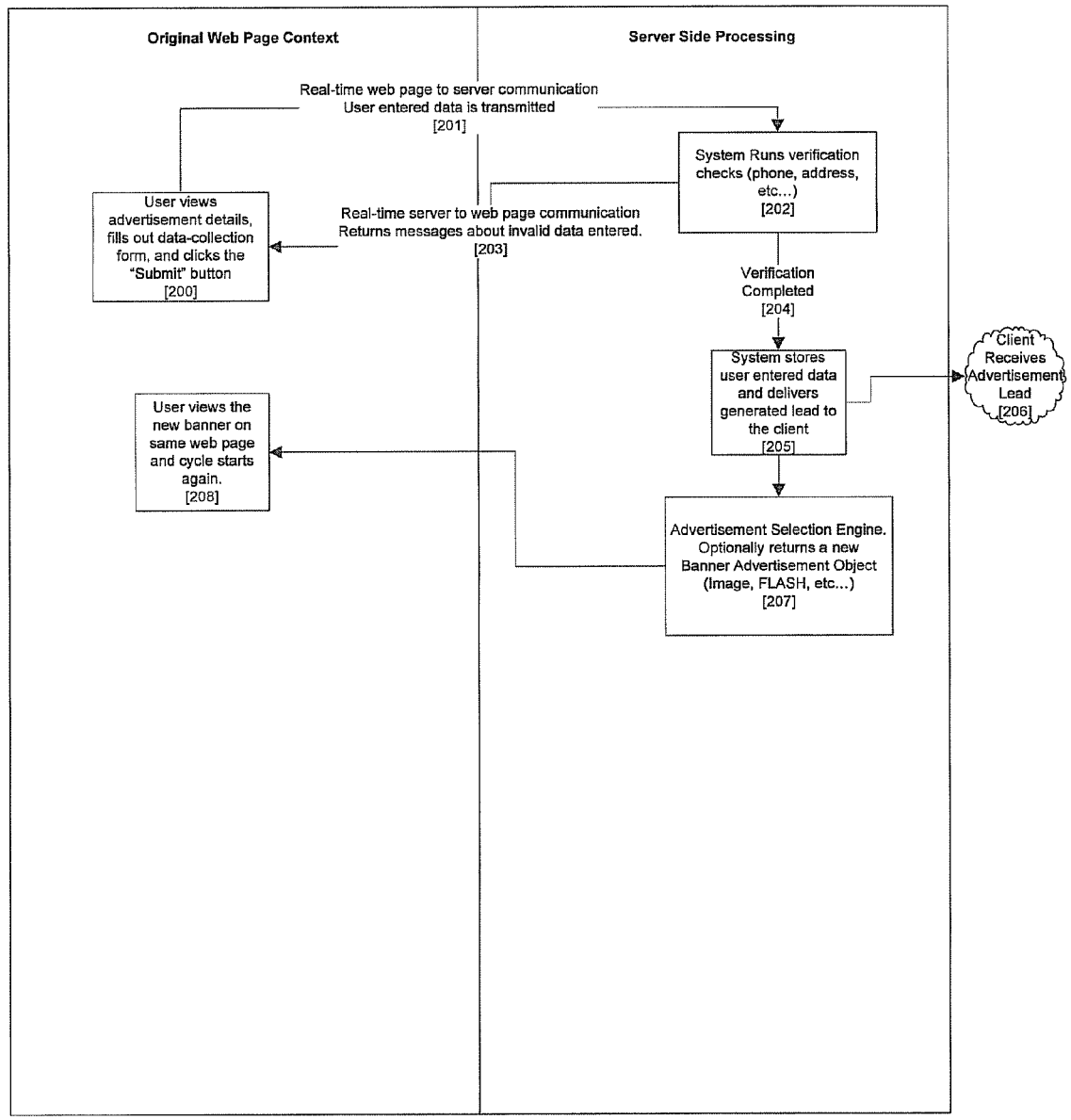
FIG. 5 details the processing of the data entered by the user.

FIG. 5 details the processing of the data entered by the user (the generated lead). This includes data verification, storage, and delivery to the advertiser, and this occurs through real-time web page to server communication within the original page context.

After the user views the additional advertisement details, completes the information requested on the dynamically generated data-collection form and clicks the "Submit" button [200], the web page transmits the user's information (usually including an email address, name, postal address, and phone number), once again, in real-time to the server via client-to-server communication, to the server-side component [box 201]. The system server side will then perform several types of data verification to ensure the veracity and quality of the user-entered information [box 202]. It will perform data verification based on specific criteria the advertiser has mandated, such as requiring certain types of fields to be filled out or certain questions to be answered in a specific way. The system will also perform generic verification of user entered information such as the validity of the address and phone number entered. The data may also be standardized, if necessary, to conform to the advertiser's requirements.

If the user-entered data fails to meet the verification requirements, then the server will generate a message to be displayed on the web page to notify the user of this failure and to ask the user to modify what has been entered [box 203]. This, once again, occurs in real-time via server-to-client communication. The user can then alter what was previously entered and submit the details again. This will cause the verification cycle to start again [box 201] until the data entered has been verified and has passed the verification stage [box 204].

Once the data has been verified [box 204], the system will store the user entered-data in a database via server-side processing and then deliver the lead to the advertiser client [box 205]. This delivered lead is formatted and delivered according to the advertiser's specifications [box 206]. Typical types of formatting include delimited type of flat files, xml formatted files, and as Excel spreadsheets. These leads may be encrypted as well. The server may also process or filter the information and data as requested by the advertiser.

Transmission to the advertiser typically occurs via FTP, email, or http. The lead may also be delivered in real-time as soon as it is collected and verified, or may be delivered upon a schedule, in accordance with the advertiser's specifications. Once the lead has been formatted and delivered, the Lead Generation process has been fulfilled, and the advertiser can then process that lead in the appropriate manner.

The invention, optionally, can then return a new banner to start the lead generation cycle over again [box 207]. Once again, this cycle would begin within the original web page context [box 208]. The system will select the most appropriate banner advertisement to display by employing a targeting engine based on previous responses and behavioral and demographic factors, as discussed previously.

The targeting engine employs a variety of techniques to match banner advertisements with specific users in specific web browsing sessions. Two such techniques used according to one embodiment of the present invention are contextual advertising and demographic matching. Each advertisement available for display is tagged with a variety of demographic attributes such as age, gender, income, location, profession, etc., which correspond to the class of people to be targeted. In addition, each advertisement is tagged with a series of keywords related to the content of the advertisement itself. Contextual advertising is an algorithm by which advertisements are selected for display based on matching the keywords to the content of the web page being viewed. Demographic matching primarily uses the demographic data inputted into a previous banner advertisement to select subsequent advertisements that have similar demographic information tags. Demographic data need not be provided explicitly by the user, and may be gleaned from the content of the web page, content of the overall web site (e.g., domain name), and from the browsing patterns (including clicking on advertisements) of the user through the use of a cookies or other tracking mechanisms. Contextual advertising, demographic matching, and matching based on such criteria as psychographic data, behavioral data, and historical data may all be used, even concurrently. When employing multiple matching algorithms, the targeting engine may select the advertisement with the highest aggregate matching score across all matching algorithms, or may select the advertisement with the highest matching score in any one algorithm.

If no information sufficient to make a match is available, the targeting engine may select an advertisement at random, and rotate the advertisements at a set interval, until the user decides to click on and/or enter data into an advertisement.

Figure 6:
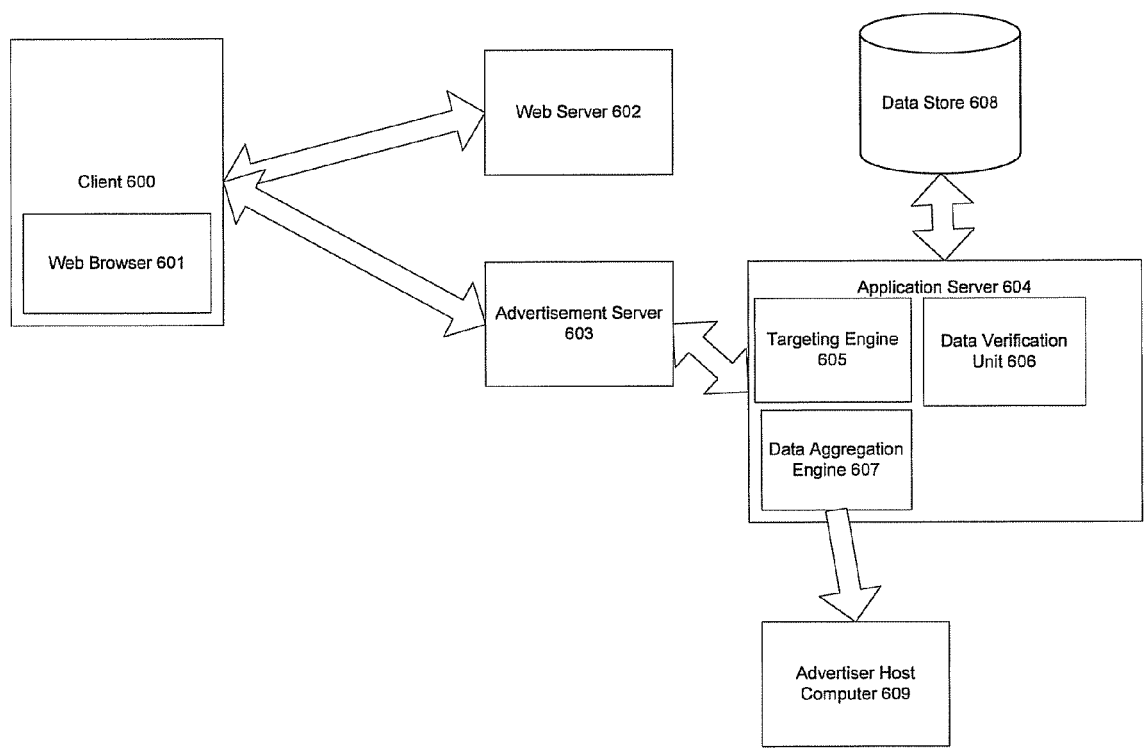
FIG. 6 illustrates a typical networked computer system that is suitable for practicing the preferred embodiment of the present invention.

FIG. 6 illustrates one embodiment of a networked computer system capable of practicing embodiments of the invention. Client 600 may be any computing device, preferably including a processor (controller, CPU), a memory and a display, and being capable of connecting to an electronic computer network, such as a LAN or the Internet, and preferably able to run a web browser application 601. In the course of browsing web pages on the Internet, client 600 may connect via the network to web server 602, which serves content web pages to client 600 and is configured to work with the present invention. The content web page sent to a user that is running client 600 contains references, e.g., by HTML code, to advertising server 603, which transmits advertisements to web browsers, such as that running on client 600, and receives data sent therefrom.

Data sent from client 600 is passed from advertising server 603 to back-end application server 604. Application server 604 handles the bulk of the data processing in the system of the invention, and contains advertisement selection (targeting) engine 605, data verification engine 606 and data aggregation unit 607. Advertisement selection (targeting) engine 605 selects the optimal advertisement to be sent by advertising server 603 to client 600 for display thereon. Advertisement selection is done with a variety of data factors, as described herein.

If the user submits data, data verification unit 606 verifies the user inputted data for accuracy and completeness, as noted herein. If the user inputted data is inaccurate or incomplete, data verification unit 606 may either send an error notice (through advertisement server 603) to the user or may discard the data. Complete and accurate data may be stored in data store 608, a memory, and may be transmitted in real time to a networked advertiser host computing device 609 owned by the company or an individual who placed the advertisement. If the user inputted data is not sent in real time to advertiser host 609, then data aggregation unit 607 may be employed to collect all user inputted data corresponding to a given advertisement and transmit it to the advertiser's networked computing device 609 according to a set schedule, as disclosed herein. Alternatively, user inputted data may also be transmitted to the advertiser by fax, phone or hard printouts.

As is understood by one skilled in the computer arts, multiple clients 600, multiple web servers 602, multiple advertisement servers 603, multiple application servers 604, multiple data stores 608, and multiple advertiser host computers 609 may be used in the present invention, as is the case with all network based technology. Furthermore, the functionality of web server 602, advertisement server 603, application server 604, and data store 608 may be combined into fewer units for efficiency or business reasons. The embodiment of FIG. 6 is a base case of the preferred embodiment, depicting all major components in the singular. However, elements of FIG. 6 may be duplicated or removed without departing from the scope of the present invention.

Similarly, each server or unit described herein may advantageously include a memory and a processor (e.g., controller, CPU) that may execute instructions stored in the memory to perform the functions with respect to embodiments of the method, as described herein. Embodiments of such devices within the invention may also include a computer readable medium, such as for example a memory, a disk drive or a USB flash memory, including instructions that, when executed by a processor or controller, carry out methods disclosed herein.

The operating system of the present invention may be run on one or more servers, e.g., web-servers, application servers and database servers that each contain one or modules operably coupled to one or more additional modules in the same or other servers as necessary to apply the current invention. As persons of ordinary skill are aware, servers contain both hardware and software. Exemplary hardware for the servers includes but is not limited to Dell PE 1950's for the web and application servers and Dell PE 2950's for the database servers. In some embodiments, the hardware comprises one or more central processing units running at the speed of at least one GHZ, with RAM memory of at least one GB on the web and application servers and 2 GB's on the Database servers. The particular power and other requirements and thus the preferable hardware for a given application are determined by the amount of data that needs to be processed, and the ability to store, process and transmit the data.

When a plurality of servers are used in combination they may communicate with one another via a network switch, while two or more web servers work in tandem utilizing a network Load-Balancer to direct incoming traffic equally between them. For example, one may use four web servers, two application servers, and two database servers operably coupled to one another. The software of the present invention is a combination of computer executable code that runs on the aforementioned servers and is stored on a computer program device that is part of the hardware. There also may be computer executable code running in the form of client-side JavaScript code that is embedded in the web sites web page and executes in each users web browser. This client-side code communicates with the server-side code directing the loading and execution of the rendering, processing, and receiving data from the banner system.

The present invention has been described with certain degree of particularity. Those versed in the art will readily appreciate that various modifications and alterations may be carried out without departing from the scope of the following claims.

The invention claimed is:

1. A method for collecting and processing data over a network comprising:
   displaying a first advertisement on a web page;
   presenting a form for data input within said first advertisement in response to an action by a user running a web browser application on a client computing device;
   collecting said user inputted data and transmitting it to a first server; and
   displaying a second advertisement on said web page in the same location on said web page as said first advertisement,
   wherein said first advertisement and said second advertisement are displayed on said web page, without said web page having been reloaded or said web browser having been redirected to a second web page in response to said action.

2. The method of claim 1, further comprising verifying said user inputted data for completeness by checking that all fields requiring data within said form have been filled or for accuracy by comparing said user inputted data to an existing database.

3. The method of claim 2, further comprising sending an error message to said user or discarding said user inputted data if said user inputted data is either not complete or not accurate.

4. The method of claim 3, wherein said step of verifying and said step of sending an error message or discarding said user inputted data is performed by said first server.

5. The method of claim 2, wherein said step of verifying said user inputted data is not performed by a server that delivers the content of said web page.

6. The method of claim 1, wherein said form is provided as an overlay on said web page.

7. The method of claim 1, further comprising sending said user inputted data to a second server from said first server.

8. The method of claim 1, wherein said step of displaying a second advertisement comprises selecting said second advertisement, said step of selecting being performed through use of a targeting engine.

9. The method of claim 8, wherein said step of selecting said second advertisement comprises use of contextual advertising, demographic matching or a combination thereof.

10. The method of claim 8, wherein said step of selecting said second advertisement is not performed by the party delivering the content of said web page.

11. The method of claim 7, wherein the content of said web page is not delivered through the use of said first server or said second server.

12. A system for collecting and processing data over a network comprising:
   an advertisement server for transferring advertisements to a client computing device over a network within the context of a web page being displayed on said device;
   a data verification unit for verifying the accuracy and completeness of data entered into forms associated with said advertisements;
   a selection and targeting engine for selecting said advertisements to be displayed for a user running a web browser application on said client computing device; and
   a data store for storing said advertisements and said data entered into said forms,
   wherein each of said forms is displayed within at least one of said advertisements in response to an action by said user, and
   wherein said advertisements are successively displayed in a web page running on said browser, without said web page having been reloaded or said web browser having been redirected to a second web page in response to said user action.

13. The system of claim 12, wherein said data verification unit checks the completeness of said data entered into said forms by checking that all fields requiring data within said form have been filled or the accuracy of said data entered into said forms by comparing said user inputted data to an existing database.

14. The system of claim 13, wherein said data verification unit sends an error message to said user or discards said user inputted data if said user inputted data is either not complete or not accurate.

15. The system of claim 12, wherein said forms are provided as overlays on said web page.

16. The system of claim 12, wherein said targeting engine uses contextual advertising, demographic matching or a combination thereof.

17. The system of claim 12, further comprising a data aggregation unit to aggregate all said user inputted data associated with each of said advertisements and to transmit said aggregated data to a server associated with the respective advertisement.

18. The system of claim 12, wherein said data verification unit, said selection and targeting engine, and said data store are not located on a web server hosting the content of said web page.

19. A system for collecting and processing data over a network comprising:
   an advertisement server for transferring a first advertisement over a network to a client computing device for display within a web page being displayed on said client computing device, and, in response to an action by a user running a web browser application on said client computing device, for generating a form associated with said advertisement for data input for display on said client computing device;
   a data verification unit for verifying the accuracy and completeness of data entered said forms associated with said advertisement;
   a selection and targeting engine for selecting a second advertisement to be displayed to a user running a web browser application on said client computing device, said second advertisement being displayed within said web page without said web page having been reloaded or said web browser having been redirected to a second web page in response to said user action; and
   at least one data store for storing said advertisements and said data entered into said forms;
   wherein said data verification unit, said selection and targeting engine, and said data store are not located on a web server that delivers the content of said web page.

20. A method for placing an advertisement on a web page, the method comprising:
   allocating space on a web page to display an advertisement; and
   inserting into said web page a reference to a block of remote code, said code configured to:
      display a first advertisement within said space on said web page;
      present a form for data input within the context of said first advertisement in response to an action by a user running a web browser application on a client computing device;
      collect said user inputted data and transmit it to a remote server; and
      display a second advertisement on said web page in the same location on said web page as said first advertisement, without said web page having been reloaded or said web browser having been redirected to a second web page, between display of said first advertisement and said second advertisement, in response to said action.

21. The method of claim 20, wherein said code is further configured to verify the completeness and accuracy of said user inputted data.

22. The method of claim 20, wherein said code is further configured to select said second advertisement.

23. The method of claim 22, wherein said selection of said second advertisement is performed through contextual advertising, demographic matching or a combination thereof.

24. The method of claim 20 wherein said code is further configured to aggregate and transmit said user inputted data with respect to each advertisement to an advertiser associated with such advertisement.

\* \* \* \* \*